July 12, 1955
W. K. LEWIS ET AL
2,712,728
GAS TURBINE INTER-STAGE REHEATING SYSTEM
Filed April 30, 1952
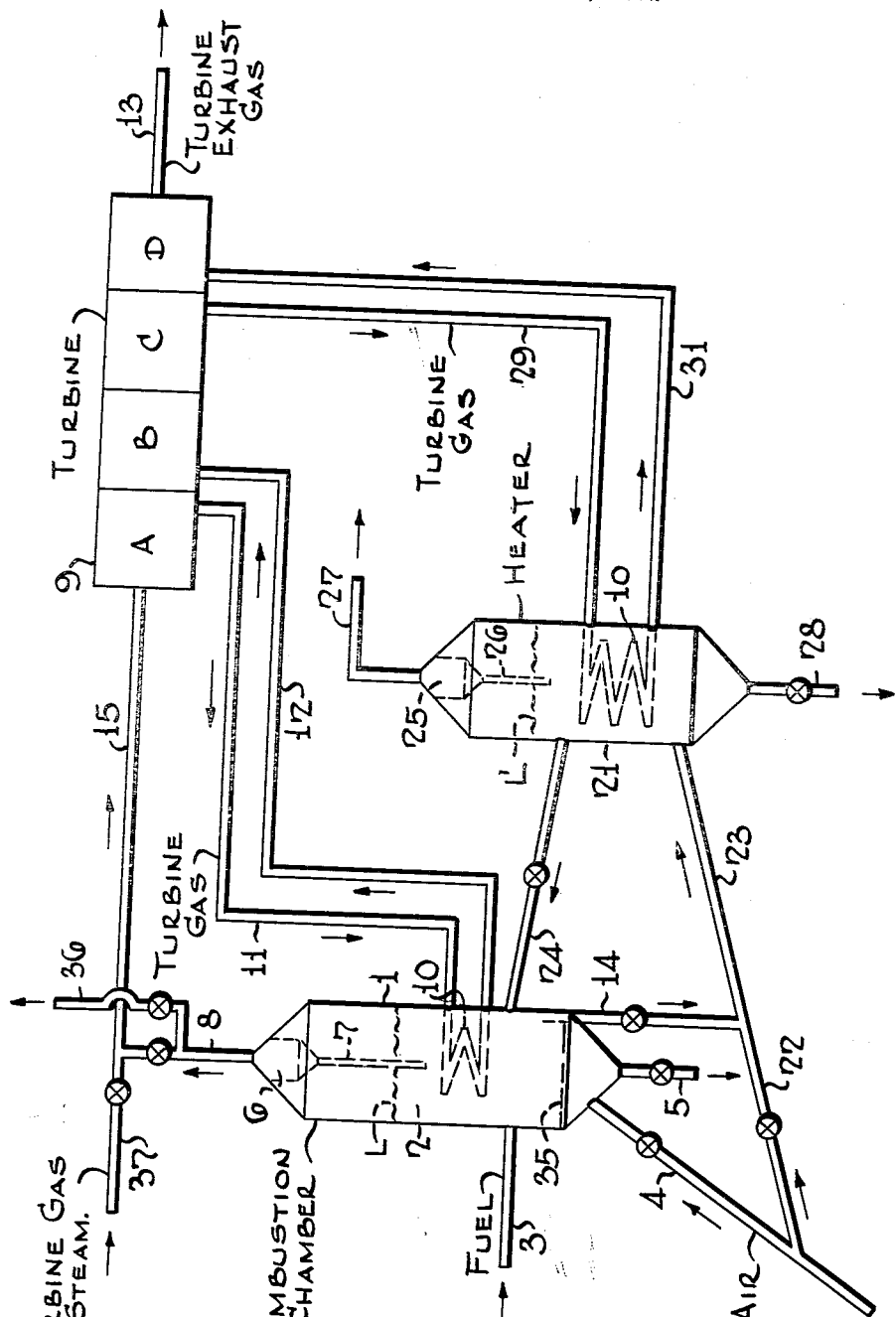
Warren K. Lewis
Edwin R. Gilliland    Inventors
By Henry Berk   Attorney United States Patent Office 2,712,728
Patented July 12, 1955

2,712,728
GAS TURBINE INTER-STAGE REHEATING SYSTEM

Warren K. Lewis, Newton, and Edwin R. Gilliland, Arlington, Mass., assignors to Esso Research and Engineering Company, a corporation of Delaware Application April 30, 1952, Serial No. 285,272

4 Claims. (Cl. 60—39.17)

This invention relates to novel means for heating gases including partially expanded gases in turbines, such as steam turbines and combustion gas turbines. A combustion gas turbine is a turbine driven by combustion gas produced in a unit intimately associated with the turbine. In its operation air is compressed in a compressor and burned with fuel injected into a combustor. The hot combustion gases are expanded through the turbine itself and discharged again into the air. The gas turbine itself operates on the same principle as the steam turbine. The turbine drives the compressor and the excess power is used to drive the load.

An improved type of combustion system for gas turbines is described in applicants' copending application Serial No. 234,552, filed June 30, 1951.

The present invention represents a novel application of the technique of interstage reheating to gas turbines. The present invention offers an important advantage in increasing the practicability of interstage reheating of the partially expanded gases in the course of their flow through the turbine unit thereby making it possible to approach more closely to isothermal expansion of the gases in the turbine.

It is also an object of this invention to provide a novel means for heating primary gases in gas turbine systems, such as steam and combustion gas turbines.

In reheating partially expanded gases in either steam or gas turbines one wants the tube walls of the reheater at as high a temperature as possible in order to keep down the necessary size of the reheater, i. e., the amount of reheating surface. On the other hand, because the gases being reheated are usually under considerable pressure, it is imperative to keep the maximum temperature to which the tube walls can rise under any conditions down below a critical level of temperature. This critical temperature depends on a combination of factors: the character of the metal, (thus, certain so-called stainless steel alloys can tolerate temperatures several hundred degrees higher than mild steel); the geometry of construction of the reheater; the maximum possible pressure which can develop in the reheater, etc. There is little difficulty encountered in design and operation provided operating conditions can be maintained constant or provided changes in operating conditions are relatively slow. However, turbines are liable to extraordinarily rapid changes in operating conditions which can easily be disastrous. Thus, if a turbine operating at relatively high load has its load suddenly reduced (e. g., by blowing a circuit breaker on the generator attached to it), the vapor stream must be immediately reduced to a very small value. Hence the heat abstraction from the reheater almost ceases and if the metal is exposed to hot furnace gases and, particularly, to radiation from hot furnace walls, metal temperature may rise drastically to very dangerous levels.

The purpose of this invention is to provide a reheating technique which maintains a high rate of flow of heat per unit area of heating surface, together with conditions ensuring safety of operation by making it impossible for sudden changes in turbine operation to allow overheating of the metal of the reheater. This is secured by using as a heating element for the provision of the heat to the reheater a body held at a substantially constant temperature not in excess of the maximum temperature which the metal walls can safely stand, which at the same time is a body of such a character that the coefficient of heat transfer from it into the metal is very high. This combination makes possible the assurance of safety in operation without the necessity of significant increase in the size of the reheater.

The reheater may be disposed in either of two ways: either as a coil embedded in a bed of solids in which the necessary heat is generated by combustion reactions occurring in the bed in relatively close proximity to the heating surface, or the heater may be outside the zone of combustion itself, the heat supply being secured by recycling the bed solids from the combustion zone through the reheater and back to the combustion zone. In the first case, safety in operation is assured by limiting the temperature, preferably automatically, of the combustion zone to that which the heating tubes can tolerate under the worst conditions of turbine operation which can develop. In the second case, it is assured by control, preferably automatic, of the supply of solids from the bed in the combustion zone to and through the reheater.

In any case, the heating element, i. e., the bed, is a bed of solids of high density and in highly turbulent motion. The density is essential in order to maintain a high temperature of the bed even when a relatively large amount of heat has been abstracted from it before reheating of the bed occurs, and the high turbulence is necessary, in conjunction with the high temperature, in order to assure a high coefficient of heat transfer and therefore make it possible to operate with a limited amount of heating surface.

It is decidedly preferable to have the heating surface in the form of metal tubes of relatively thick walls and small diameter, because these are the safest form of construction for the conditions of operation. However, these tubes can be used in various ways, e. g., as coils or as straight tubes between headers. The type of arrangement of the tubes is usually dictated by the relation of the tubes to the nature of the equipment employed.

When for any reason it is desirable to operate the combustion bed at a temperature level above the safe tolerance temperature for the heating tubes, one would use a heater external to the combustion bed, circulating the fluidized solids around the tubes in the heater. This would be the situation when temperature tolerance of the heater tubes is too low for reasonably rapid combustion in the bed. Otherwise, embedding the heating tubes in the combustion bed is likely to prove simpler and cheaper.

A heater external to the combustion bed need not be external to the combustion vessel. The heating tubes can be in a vertical conduit within the combustion vessel, the circulation of solids through which is controlled by some suitable movable valve or equivalent, placed in the path of the circulation of solids from the combustion zone to and through the heating tubes.

According to this invention, therefore, partially expanded gases are removed from a stage of the gas turbine and reheated indirectly with hot, turbulent solids contained within a heating zone, preferably a combustion zone. The reheated gases are removed from the heating zone and returned preferably to the next succeeding stage of the turbine. In a preferred modification of the invention a combination zone containing finely-divided, heat-carrier solids is provided wherein fuel is burned to produce hot gas for the turbine in accordance with the process described in the aforesaid Serial No. 234,552. Preferably a heating element is imbedded in the solids contained in the combustion zone. Partially expanded gases are removed from a given stage of the turbine, circulated through the heating element imbedded in the solids and after being reheated are returned to a later stage of the turbine, preferably the next succeeding stage. These gases may be removed again from a later stage of the turbine and the reheating cycle repeated on the withdrawn gases. Alternatively, the gases may be reheated only once depending on the efficiency desired from the turbine.

It is well known that the coefficient of heat transfer from a mass of solids intimately commingled with a gas and more or less supported in it, under conditions whereby both gas and solid are moving, both relative to each other and to a heat exchange wall, preferably under conditions of higher turbulence, is far higher than that from a gas alone to the same wall in the absence of solids. Consequently, when reheating partially expanded turbine gases in order to keep the heating surface area to a reasonable figure, the heating element must be exposed to a high temperature in order to get the necessary heat flow through the walls. This results in danger of overheating the wall which in turn is intolerable because of the fact that the partially expanded gases are at still relatively high pressure so that mechanical failure of the wall is likely to result. By imbedding the heating element for interstage reheating in a bed of solids commingling with fluidizing gases, the temperature of the heating element is kept low and yet the heat flux high thereby reducing the amount of heating surface needed and greatly enhancing the safety of the operation. The presence of the relatively low temperature cooling surface in the combustion zone can lower the temperature of the combustion gases and suspended solids in the immediate neighborhood of the coil surfaces enough so that the combustion reactions do not occur at that particular point. However, the moment these cooled solids mix out with the main body of solids in the combustion zone they are reheated so quickly to the bulk temperature of the mass that the combustion reactions are not interfered with to any significant degree.

Combustion in a fluidized bed lends itself very advantageously to interstage reheating of the partially expanded gases or vapors flowing through any turbine by submerging the reheating element in the bed. Where it is desirable to maintain the temperature level in the combustion bed higher than the desirable maximum temperature in the reheater, solids can be withdrawn continuously from the former and recycled back through an external heater. The temperature of the solids in the reheater can be controlled at any desired level by control of the rate of flow of the solids circulating through it. This re-circulation is easily accomplished by use of a small part of the air supply to the combustion zone by-passed through the reheater circuit and thence back into the combustion zone where it will play its part in the combustion process. In this case it is desirable to withdraw the re-circulating solids from the fluidized bed in the combustion chamber, e. g., through a short standpipe and return them on leaving the heater to the combustion zone.

The manner in which the invention is carried out will be more fully understood from the following descriptions when read with reference to the accompanying drawing which represents a semi-diagrammatic view in elevation of apparatus suitable for the purpose.

The drawing represents an embodiment of the invention in which partially expanded turbine gases are reheated by passing them through a heating element imbedded in a mass of hot solid particles of a heat carrying material.

Referring to the drawing, numeral 1 represents a combustion chamber containing a subdivided solid substance 2 supported on a grid 35. The solids when fluidized with an appropriate gas, as will be described later, resemble a boiling liquid having a well defined upper level L. The diameter of vessel 1 is determined by the gas velocity necessary for maintaining good fluidization therein and its depth must be sufficient to give adequate contact time for combustion and heat transfer between solids and gases. The subdivided solids contained in vessel 1 develop good solids mixing and therefore assure constant, steady temperature, absence of localized overheating, and high coefficient of heat transfer. Fuel is introduced into the combustion chamber via line 3. The fuel is a hydrocarbon gas such as methane, ethane or natural gas; a liquid hydrocarbon such as diesel oil, bunker fuel oil; or a solid fuel such as coal, etc. The technique of combustion in vessel 1 is particularly applicable to the handling of ash-containing fuel oils and powdered coals. However, cleaner fuels such as the hydrocarbon gases mentioned are ideal. Air preferably preheated, and at a pressure of 75–200 p. s. i. g., preferably about 90–150 p. s. i. g., is introduced into vessel 1 via line 4. Combustion of the fuel with air occurs in vessel 1. The temperature of the vessel is maintained at a high enough temperature to promote good combustion. Air is introduced from line into vessel 1 usually in an amount at least substantially equal to the theoretical amount of air required to burn the fuel in the combustion zone to $CO_2$ and water vapor. However, the air introduced to vessel 1 can well be less than theoretical. This would be equivalent to running vessel 1 essentially as a gas producer. However, it would offer an extremely effective means of controlling the temperature in vessel 1 to the safe limit, which must be done when a coil is imbedded in it, by controlling the amount of air supply. If operated this way, a burner (a high intensity combustor) would be inserted in line 15. The temperature of the gases from this combustor will be controlled by the amount of excess air introduced into the high intensity burner.

When employing a gaseous fuel, the fuel and air may be mixed prior to introduction into vessel 1. The fuel is burned in the vessel in the presence of the finely divided inert solids, e. g. sand, crushed fire brick, silica, alumina, etc. The solids are fluidized by the upflow compressed air and the resulting combustion gases. Combustion gases travel up through the combustion chamber and pass into the cyclone system 6 wherein any solid particles are separated from the gas and returned to the bed of solids via dip leg 7. The combustion gases free of solids pass overhead via line 8 and enter the turbine 9 via line 15. The combustion system described in this invention may be operated independently or in combination with any other source of turbine gases. If the system is used in conjunction with a steam turbine the combustion gases can be mixed directly with the steam entering the turbine unit via line 37, or preferably removed via line 36 for heat recovery. Provision is made for removal of a stream of solids via pipe 5 periodically or otherwise to keep the solids contained in vessel 1 at a proper level. This purge stream is especially useful when heavy residual fuel oils or coals of high ash content are burned in vessel 1.

The hot compressed turbine gases of a common turbine cycle enter the first stage of turbine 9 at a pressure of 75 to 250 p. s. i. g. and at a temperature of 1200° F. to 1800° F., preferably about 1400° F. to 1600° F. The turbine is illustrated as containing a series of successive stages, A, B, C, and D. According to the invention partially expanded gases are removed from stage A and circulated via pipe 11 through heating element 10 imbedded in the bed of hot solids in vessel 1. Heat is imparted to the gases and the reheated gases are returned via pipe 12 to the next succeeding stage of the turbine, namely stage B. If desired gases leaving any or all of the intermediate stages of the turbine may be reheated in a similar manner and returned to the next succeeding stage of the turbine. Pressures of the exhaust gases leaving the turbine via line 13 are usually close to atmospheric. Exhaust gas temperatures depend upon the nature of the whole turbine cycle and the exhaust gas pressure. In the usual commercial operation employing a feed gas to the turbine of 1200° F. to 1600° F. the exhaust gases fall to a temperature of 400° F. to 800° F. Pressures and temperatures throughout the turbine system depend upon the turbine design which in turn is preferentially influenced by a large number of operating conditions in the power plant part of the system which vary from case to case. The exhaust gases are disposed of by conventional means, e. g. by heat exchange or otherwise.

A situation may well arise in which the temperature, which it is desirable to maintain in the fluidized bed of the combustion chamber to secure best combustion results, is higher than the maximum to which it is desirable to submit the inter-stage reheating coil (because of its metallographic limitations). In this event, the heating element 10 is relocated in a heating unit 21 external to the combustion unit. The heat is furnished to the heating unit by circulation of fluidized solids from the combustion unit 1 through the heater unit 21 and back to the combustion unit, controlling the heat supply to the heater as sensible heat in the fluidized solids flowing to it by control of the rate of circulation of those solids through it. The solids circulation is secured by withdrawing solids from the combustion unit at a suitable point in the fluidized bed, e. g. through standpipe 14 which may be relatively short and moving those solids through the heater via pipes 23 with the aid of a gas via line 22, e. g. a small amount of air from the main stream flowing to the combustion bed. In vessel 21 the solids are maintained at an upper level L'. The bypassed air, plus the recirculating solids from the heater are returned via pipe 24 to the combustion zone at a relatively low point in the bed so that the air could still serve for maintaining the desired combustion. Purge line 28 is provided for removal of solid from vessel 21 for ash removal, dumping, etc. If desired, air and any occluded combustion gases can be removed from vessel 21 via line 27 for venting purposes after passage through cyclone system 25 which is provided with dip leg 26 for the return of any entrained solids to vessel 21. Partially expanded gases are removed from an intermediate turbine stage via line 29, reheated by passage through heating coil 10 and returned to the next succeeding turbine stage via line 31. In the illustration this process is shown to occur in stages C and D. However, it may be applied to any partially expanded gases present in any stage of the turbine. This embodiment gives independent control of temperature of the combustion zone and of the heat supply to the inter-stage reheater and hence of the temperature of the heating medium in it. Particularly in any closed cycle turbine system, the gases to the first stage are also advantageously heated by flow through a coil 10.

The type of turbine employed is not a feature of this invention since the reheating means described is applicable to the operation of any type of staged gas or steam turbines.

The solid substance employed as a heat carrier in the process of this invention should be one which (a) is capable of fluidization, (b) will not flux at suitable combustion chamber temperatures, (c) is cheap, (d) is a good carrier of ash from such fuels as residual fuel oil, (e) will not melt at temperatures below about 1400° F. to about 2000° F. or even higher, (f) is not destroyed by combustion, and (g) preferably contains a metal oxide stable under furnace conditions which will rapidly oxidize the fuel. Suitable solids are sands, clays, alumina, kaolin, silica-alumina mixtures, powdered fire brick, iron oxides, particularly a mixture of $Fe_2O_3$ and $Fe_3O_4$, etc.

It is also within the scope of this invention to mix with the above-mentioned suitable solids another solid which will combine with deleterious constituents contained in certain residual hydrocarbon fuels or in the ash produced from the combustion of said fuels. For example, chemicals such as calcium oxide, barium oxide or salts of calcium or barium, such as calcium carbonate, barium carbonate, etc. may be added to the solids in the combustion zone in order to bring about chemical reaction with acidic oxides such as oxides of vanadium contained in the ash resulting from combustion of heavy residual fuels, such as heavy diesel oils, bunker fuel oils, etc. The chemical combination produces salts such as calcium vanadates, barium vanadates, etc. which are non-volatile and remain as residue in the solids employed in combustion zone and which can be separated therewith from the combustion gas. The deleterious effect of these materials on the metal, e. g., of the coils, is thereby prevented.

The difficult problem of adequate mixing of fuel and air in the combustion chamber 1 is avoided by another modification of this invention which involves the incorporation in the solids in the combustion zone of relatively substantial quantities of metal oxides of a character such that they will oxidize the fuels extremely rapidly at the reactor temperature. The best of these is $Fe_2O_3$ which is not only effective but readily available and cheap. Other oxides such as the oxides of manganese and copper are good substitutes, but not the equivalent of $Fe_2O_3$. Fuel cannot rise through a bed of solids such as that described and escape substantially complete combustion if that bed contains substantial amounts of an oxide such as $Fe_2O_3$ distributed therethrough, and if the bed is of adequate density, depth, and temperature. It has been found that $Fe_2O_3$ contents as low as 10% based on the total solids in the bed are usually adequate.

In the combustion zone a bed depth of at least 5 ft. is preferred although deeper beds offer a greater safety factor in operating, although at the expense of a greater corresponding pressure drop in the bed. The bed density can be as low as 8 to 10 lbs. per cu. ft. although densities twice these amounts and greater are usually desirable. Temperatures as low as 1500° F. can be tolerated although it is desirable to be at a level of 1600° F. or above.

In such a bed (i. e. solids containing a metal oxide such as $Fe_2O_3$) the necessity for complete mixing of fuel and air disappears in that complete combustion of the fuel can be secured without it. However, when so operating it is preferable to add to the combustion zone a modest excess amount of air over the theoretical required for the combustion of the fuel. Any fuel, even though there be no air mixed with it, in its ascending path through the bed passes over and through such a large amount of $Fe_2O_3$ that oxidation of the fuel is complete. It is true that this reduces the $Fe_2O_3$ to $Fe_3O_4$ which latter oxide will by no means give complete oxidation of the fuel. However, the mixing of the solids in a well fluidized bed is so good that in short order that portion of the bed which has been somewhat depleted of its available oxygen (i. e. reduction of some of the $Fe_2O_3$ to $Fe_3O_4$) gets into a zone in the bed through which air mixed with insufficient fuel to combine with all its oxygen is rising. This air reoxides the $Fe_3O_4$ back to the $Fe_2O_3$ state. The rate of this reaction at the temperatures existing in the combustion zone is extremely high. Consequently, the $Fe_2O_3$ content of the bed never falls to a serious degree so long as there is a modest excess of air over that essential for combustion of the fuel in the bed. This excess of air is but a small amount of the theoretical air required to completely burn the fuel.

What is claimed is:

1. A gas turbine system comprising a gas turbine containing a plurality of stages, means for introducing gas into the first of said turbine stages, means for withdrawing exhaust gas from the last of said turbine stages, a combustion chamber containing hot turbulent finely divided, non-combustible, solid particles in contact with gaseous combustion products, a heating chamber containing hot turbulent solid particles, a surface heater maintained in contact with said solid particles in said heating chamber, means for conveying hot solid particles circuitously between said combustion chamber and and heating chamber, means for conveying partially expanded gas from one of said turbine stages to said surface heater, means for returning said partially expanded reheated gas from the surface heater to a succeeding stage of the turbine, and means for conveying gaseous combustion products from the combustion chamber to the turbine.

2. A gas turbine system comprising a gas turbine containing a plurality of stages, means for introducing gas into the first of said turbine stages, means for withdrawing exhaust gas from the last of said turbine stages, a combustion chamber containing hot turbulent, finely divided, non-combustible, solid particles in direct contact with gaseous combustion products, a surface heater in contact with said hot solid particles, means for conveying partially expanded gas from one of said turbine stages to said surface heater, means for returning said partially expanded reheated gas from the surface heater to a succeeding stage of the turbine, and means for conveying gaseous combustion products from the combustion chamber to the turbine.

3. A gas turbine system comprising a gas turbine containing a plurality of stages, means for introducing gas into the first of said turbine stages, means for withdrawing exhaust gases from the last of said turbine stages, a combustion chamber containing hot, turbulent, finely divided, non-combustible, solid particles including a material selected from the group consisting of oxides and salts of calcium and barium in direct contact with gaseous combustion products, means for introducing residual hydrocarbon fuel and a free oxygen containing gas to the combustion chamber, a surface heater in contact with said hot solid particles, means for conveying partially expanded gas from one of said turbine stages to said surface heater, means for returning said partially expanded reheated gas from the surface heater to a succeeding stage of the turbine, and means for conveying gaseous combustion products from the combustion chamber to the turbine.

4. A gas turbine system comprising a gas turbine containing a plurality of stages, means for introducing gas into the first of said turbine stages, means for withdrawing exhaust gas from the last of said turbine stages, a combustion chamber containing hot, turbulent, finely divided, non-combustible, solid particles including $Fe_2O_3$ in direct contact with gaseous combustion products, means for introducing fuel and a free oxygen containing gas to the combustion chamber, a surface heater in contact with said hot solid particles, means for conveying partially expanded gas from one of said turbine stages to said surface heater, means for returning said partially expanded reheated gas from the surface heater to a succeeding stage of the turbine, and means for conveying gaseous combustion products from the combustion chamber to the turbine.

References Cited in the file of this patent

UNITED STATES PATENTS

| | | |
|---|---|---|
| 1,089,115 | Curtis | Mar. 3, 1914 |
| 1,099,019 | Camp | June 2, 1914 |
| 1,502,964 | Rodgerson | July 29, 1924 |
| 2,462,861 | Gunness | Mar. 1, 1949 |
| 2,471,104 | Gohr | May 24, 1949 |
| 2,478,504 | Ruegg | Aug. 9, 1949 |
| 2,535,140 | Kassel | Dec. 26, 1950 |
| 2,637,629 | Lewis | May 5, 1953 |

FOREIGN PATENTS

| | | |
|---|---|---|
| 215,485 | Switzerland | Oct. 1, 1941 |